Jan. 28, 1936.                J. J. TAYLOR                2,028,930
VIBRATION DAMPER AND PROCESS OF ASSEMBLY
Filed March 2, 1934

INVENTOR
John J. Taylor.
BY
ATTORNEY

Patented Jan. 28, 1936

2,028,930

UNITED STATES PATENT OFFICE 2,028,930

VIBRATION DAMPER AND PROCESS OF ASSEMBLY

John J. Taylor, Barberton, Ohio, assignor to The Ohio Brass Company, Mansfield, Ohio, a corporation of New Jersey Application March 2, 1934, Serial No. 713,659

9 Claims. (Cl. 173—13)

This invention relates to means for damping out vibrations in hollow conductors, such as are used for high potential transmission lines. The invention is also applicable to hollow bus bars and other hollow tubes or pipes subject to vibration.

One object of the invention is to provide a vibration damper which may be entirely enclosed in the member to which it is applied.

Another object of the invention is to provide a vibration damper which will not increase the liability to corona losses of charged members to which the damper is applied.

A further object of the invention is to provide a device of the class named which shall be of improved construction and operation.

Other objects and advantages will appear from the following description.

The invention is exemplified by the combination and arrangement of parts shown in the accompanying drawing and described in the following specification, and it is more particularly pointed out in the appended claims.

Conductors for high potential transmission lines are often made in the form of hollow tubes or tubular members in order to increase the size of the conductor for a given cross section of the material. This greatly diminishes the tendency for the formation of corona or electrical discharge for high potentials. Such conductors are subject to vibration, due chiefly to the effect of air currents. This tends to decrease the life of the conductor by producing fatigue adjacent its points of support. Various forms of hollow tubular members have been proposed for conductors of this kind.

Figures 1, 2:
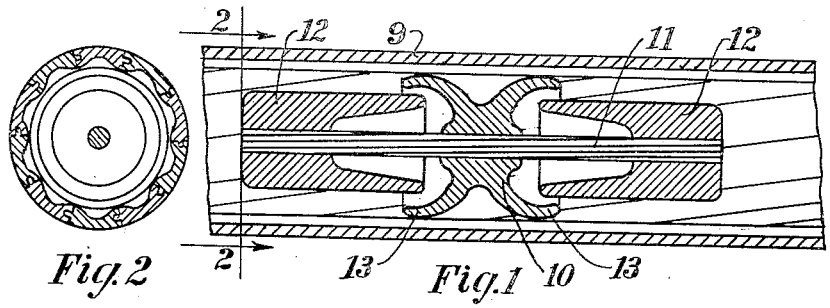
Fig. 1 is a sectional view of a portion of an electrical conductor having one embodiment of the present invention applied thereto.
Fig. 2 is a section on line 2—2 of Fig. 1.

Fig. 1 illustrates one form of hollow conductor 9 made up of strips arranged edge to edge and held together by a tongue and groove formation. It will be understood, however, that this form of conductor is only illustrated by way of example and that the invention applies to any form of hollow conductor. The vibration damper shown in Fig. 1 comprises a supporting block 10 to which is secured a section of resilient cable 11 made up of a number of strands of resilient material twisted together. The cable 11 projects at each side of the block 10 and carries weights 12 at the opposite ends thereof. Damper units comprising supporting blocks and resiliently carried weights are distributed at suitable intervals along the cable, the spacing depending upon the weight of the cable and the amount of vibration to which it is subjected. A sufficient number of damper units will be provided to effect the amount of damping required. The block 10 may have resilient skirts 13 at opposite sides thereof which engage the interior of the cable so as to retain the block in place and support the arms 11.

It will be apparent that the weights 12 are so poised that the ends of the arms 11 will be held stationary by the inertia of the weights 12 when the cable is vibrated and any movement of the cable will flex the arms 11, moving the strands relative to one another and thus absorbing the energy of vibration. This energy has been found to be comparatively slight so that a slight amount of absorption will prevent vibrations of detrimental amplitude from being built up in the cable. The damper units may be inserted in the cable in any convenient way. A cable of the kind illustrated is usually formed by feeding the various strands from reels disposed about the axis of the forming cable, the cable being given the desired twist as the strands are brought together and as the cable is fed longitudinally. The strands are locked together by passing the cable as it is formed through a die and over a mandrel which clamp the spaced tongues at one edge of each strand over the single tongue of the next adjacent strand. One method of inserting the vibration dampers is to employ a hollow mandrel and feed the dampers to the interior of the cable through the mandrel. The spring skirts 13 are sufficiently compressed to permit the damper to be fed through the mandrel and as soon as it emerges from the end of the mandrel within the cable, the spring skirts will expand and engage the interior of the cable so as to retain it in place.

Figure 3:
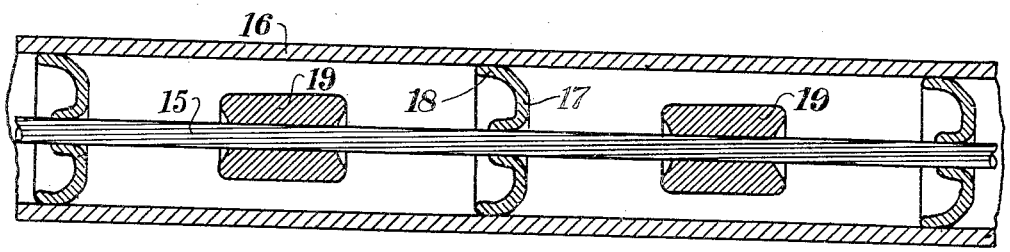
Figs. 3, 4 and 5 are longitudinal sections of conductors showing other forms of the invention.

In the form of the invention shown in Fig. 3, an internal cable 15 extends throughout the entire length of the hollow conductor 16. The cable 15 is supported at spaced intervals by supporting blocks 17 having resilient skirts or flanges 18 which engage the interior of the conductor and hold the cable 15 in position. Weights 19 are secured to the conductor 15 between the blocks 17 and tend to remain in place when the conductor is vibrated, thus flexing the cable 15 and damping out vibrations. The form of damper shown in Fig. 3 may be fed to the conductor during fabrication, the cable 15 being fed forwardly with the conductor and drawing the parts attached thereto into position. The damping mechanism shown in Fig. 3 may also be drawn into the conductor after the conductor is finished, since the skirts 18 are turned in the same direction and tapered so that they will yield so as to permit movement along the conductor. This enables the damper of this kind to be readily drawn into tubes having solid walls or other forms of hollow conductors.

Figure 4:
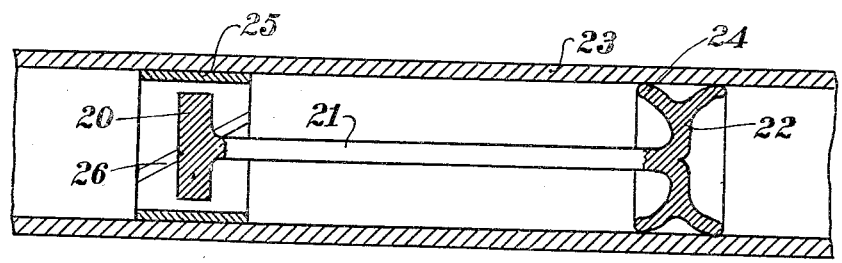

In the form of the invention shown in Fig. 4, a weight 20 is supported on a spring arm 21 carried by a supporting block 22 disposed within the conductor 23. The block 22 has bearing skirts 24 which resiliently engage the interior of the conductor to hold the block in place. In this case the energy of vibration is absorbed by impact of the weight 20 upon an impact ring 25. The ring 25 is preferably slit, as shown at 26 to permit sufficient compression to enable it to be inserted in the conductor and permit it to expand so as to be retained in place. This form of the invention may be inserted in the conductor during fabrication or after completion; the parts are compressible to permit insertion into position.

Figure 5:
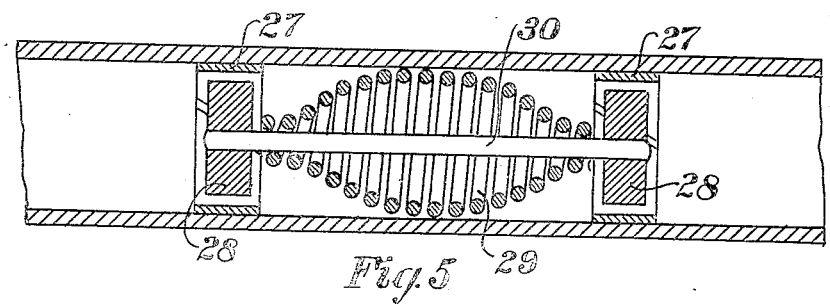

In the form of the invention shown in Fig. 5, two impact rings 27 are provided for each damper unit. A hammer or weight 28 is resiliently supported inside of each ring by means of a spring member 29 which resiliently carries a bar 30 to which the weights 28 are attached. It will be apparent that the spring member 29 may be readily contracted to permit its insertion in the conductor and the impact rings 27 being slit may also be compressed for assembly. The supporting blocks 10, 17 and 22 and the impact rings 25 and 27 all form internal support members for the conductor, which not only serve the purpose of damping out vibrations but also act to prevent collapse of the conductor which in some forms of conductor is of great value.

The vibration dampers provided by the present invention being entirely enclosed within the conductor are not exposed to weather and hence are not impaired by corrosion or by sleet or other ice formation on the conductor and do not detract from the appearance of the line, nor do they increase the corona losses. Being of small size, they may be distributed along the conductor so as to provide energy absorbing means for damping out the conductor throughout its entire length.

It will be noted that the various weights 12, 19, 20 and 28 are resiliently poised so that any slight movement of the cable will flex the resilient support and produce relative movement between the weight and cable. The vibrations of a suspended conductor produced by air currents are in a vertical direction so that a loose weight carried by such a conductor and resting on a support fixed to the conductor will not ordinarily be moved relative to the conductor by conductor vibrations. For instance, if the conductor were partially filled with loose material, the vibrations ordinarily would not produce movement of the loose particles relative to the conductor for the reason that the particles would merely move up and down with the conductor. In order to displace the loose particles relative to the conductor, there would have to be a downward acceleration greater than the acceleration due to gravity, and most damage to conductors is produced by vibrations which do not reach this degree of acceleration. Where the weight is resiliently poised, however, as in the present invention, any slight vertical vibration of the conductor will cause relative movement and a consequent damping action.

I claim:

1. The combination with a tubular conductor, of a support disposed within said conductor and held in fixed relation thereto by connection with the interior of said conductor, a weight carried by said support within said conductor and movable relative to said support there being clearance space between said weight and the wall of said conductor providing for movement of said weight within said conductor in a direction transverse to the axis of said conductor, and energy absorbing means connecting said support and weight for absorbing energy when said conductor is accelerated in a direction transverse to its axis.

2. The combination with a hollow conductor, of a support disposed within said conductor and fixed thereto by connection with the interior of said conductor, a flexible member carried by said support, and a weight mounted on said flexible member within said conductor for flexing said member when said conductor is accelerated, there being clearance space between said weight and the wall of said conductor providing for movement of said weight within said conductor in a direction transverse to the axis of said conductor.

3. The combination with a hollow conductor, of a vibration damper arranged to be inserted into said conductor, a portion of said damper being contractible to permit insertion in said conductor and expansible to engage said conductor after insertion to hold said portion in fixed relation to the conductor, a second portion of said damper being resiliently supported within said conductor by said first named portion and having restrained movement within said conductor to damp out vibrations.

4. The combination with a hollow conductor, of a contractible support arranged to be inserted in said conductor, said support being expansible to engage the interior of said conductor after insertion therein, and vibration damping means carried by said support within said conductor said means comprising a weight resiliently poised in said conductor on said support.

5. The combination with a hollow conductor, of a support arranged to be inserted in said conductor, said support having a normal diameter greater than the interior diameter of the conductor but being sufficiently compressible to permit ready insertion into the conductor and being resiliently expansible to engage the interior wall of the conductor and hold itself in place within the conductor, a stranded resilient member carried by said support, and a weight carried by said resilient member and movable relative to said conductor in a direction transverse to the axis of said conductor and adapted to flex said resilient member when said conductor is vibrated.

6. The combination with a hollow conductor, of a cable extending through said conductor, supports for said cable longitudinally spaced from one another within said conductor, said cable being suspended between said supports for movement relative to said conductor in a direction transverse to the axis of said cable, and vibration damping means on the portions of said cable between said supports.

7. The combination with a hollow conductor, of a stranded cable extending through said conductor, means for supporting said cable in spaced position relative to the walls of said conductor, and weights carried by said cable at spaced positions thereon for flexing said cable when said conductor is vibrated to damp out vibrations.

8. The combination with a conductor, of a weight disposed within said conductor and resiliently poised so that slight vertical acceleration of said conductor produces relative movement between said conductor and weight and means connected to the interior of said conductor and supporting said weight out of contact with the portion of the wall of said conductor directly beneath the weight.

9. The combination with a hollow conductor, of a weight disposed within said conductor and resiliently poised therein out of contact with the interior of said conductor, means cooperating with said weight to dissipate energy when said conductor is moved relative to said weight and means secured to the interior of said conductor and supporting said energy dissipating means.

JOHN J. TAYLOR.